Feb. 24, 1925.

A. J. BOCKWITZ

PISTON

Filed Oct. 19, 1920

1,527,535

Inventor
Andrew J. Bockwitz,
By Chas. J. Williamson
Attorney

Patented Feb. 24, 1925.

1,527,535

UNITED STATES PATENT OFFICE.

ANDREW J. BOCKWITZ, OF TWIN FALLS, IDAHO.

PISTON.

Application filed October 19, 1920. Serial No. 417,927.

*To all whom it may concern:*

Be it known that I, ANDREW J. BOCKWITZ, a citizen of the United States, residing at Twin Falls, in the county of Twin Falls and State of Idaho, have invented certain new and useful Improvements in Pistons, of which the following is a specification, reference being had therein to the accompanying drawing.

My invention relates to packing for pistons whether those of steam, air, and gas engines or pumps, my object being, at all times, notwithstanding wear, to maintain tight joints with a minimum of friction on and wear of the cylinder walls, thus securing a maximum efficiency with minimum waste of energy and wear of parts.

Briefly described, my invention contemplates the use of two or more split metal rings placed side by side in an annular groove in the periphery of a piston with inclined surfaces on groove wall and adjacent ring, the inclination of the groove wall being undercut so that by the radial expansion of the contacting ring the latter will tend to move axially of the cylinder and thus result in tight contact of the inclined surfaces against one another and also of abutting surfaces of adjacent rings.

Figure 1:
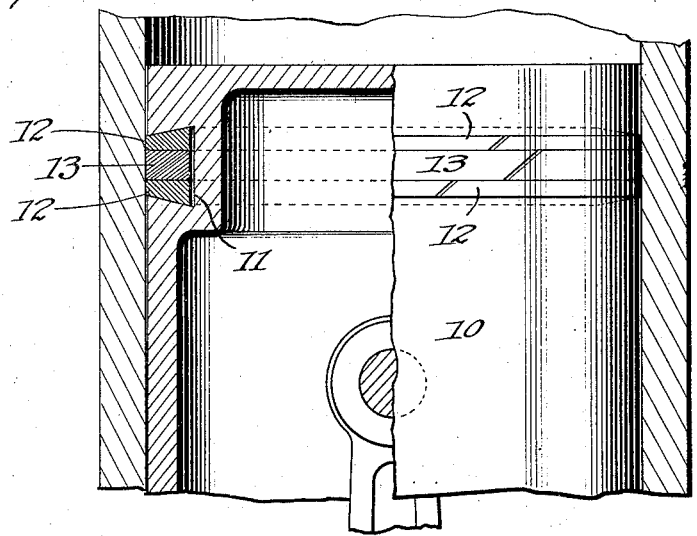
Fig. 1 is a view partly in vertical section and partly in side elevation of enough of a gas engine piston to illustrate one form of my invention.

Describing with more detail what is shown in the accompanying drawings to exemplify my invention and referring in particular to Fig. 1, the piston, 10, has an annular groove, 11, in its circumference, both of whose opposite walls are inclined outward and towards each other, and in such groove there are two similar split spring rings, 12, spaced apart with adjacent faces parallel and with their faces next the inclined wall of the groove correspondingly inclined so that any outward expansion of said rings, 12, results in movement or tendency of movement towards one another and upon an interposed packing ring, 13, of ordinary construction placed between them. The outer peripheries of the rings, 12, are of the same diameter as that of the ring, 13, so that all three rings have contact with the cylinder wall and thus afford an extended continuous surface. As wear of the packing ring, 13, takes place it expands outward to maintain its contact with the cylinder wall but at all times it is pressed against its opposite sides by the expanding action of the rings, 12.

Figure 2:
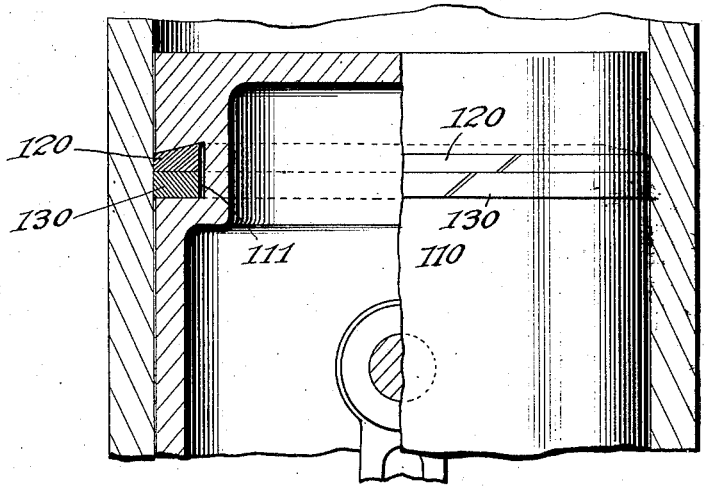
Fig. 2 is a similar view of another embodiment of my invention.

In the form of my invention shown in Fig. 2, I employ but one ring, 120, corresponding to the ring, 12, of Fig. 1, and the annular groove, 111, in piston, 110, has but one inclined surface so that the expanding packing ring, 130, with opposite sides parallel fits between the adjacent parallel wall of the groove, 111, and the adjacent parallel surface of the ring, 130. The construction and action of the parts in other respects are the same as in the case as what is shown in Fig. 1.

It, of course, is to be understood that I do not limit myself to any particular angle of inclination of abutting surfaces of ring and piston groove.

Preferably the cylinder engaging periphery of the rings with inclined faces is less than the cylinder engaging surfaces of the other ring which latter may be regarded as the packing ring proper.

The rings can be of eccentric or concentric construction.

What I claim is:

A piston packing comprising an annular groove in the periphery of the piston, a plurality of rings in such groove with peripheries that contact with the cylinder, the groove and certain of said rings having inclined contacting surfaces, and a ring intermediate the rings with the inclined surfaces with its opposite sides in planes at right angles to the cylinder axis.

In testimony whereof I hereunto affix my signature.

ANDREW J. BOCKWITZ.